Feb. 10, 1925.                                                                    1,526,166
G. E. MANAHAN
CALENDAR
Filed June 16, 1923                   2 Sheets-Sheet 1
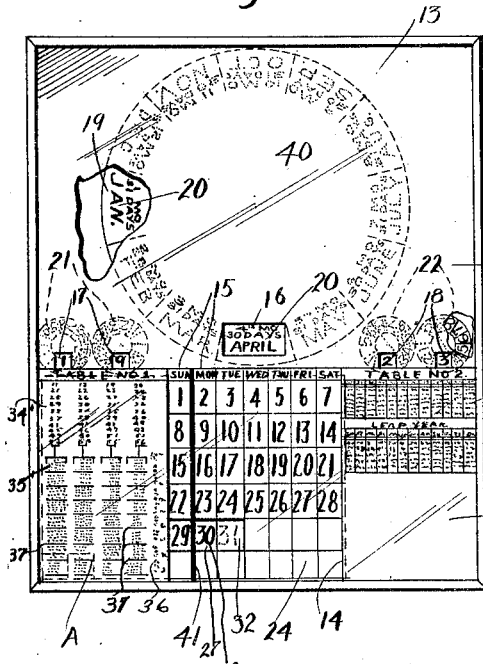
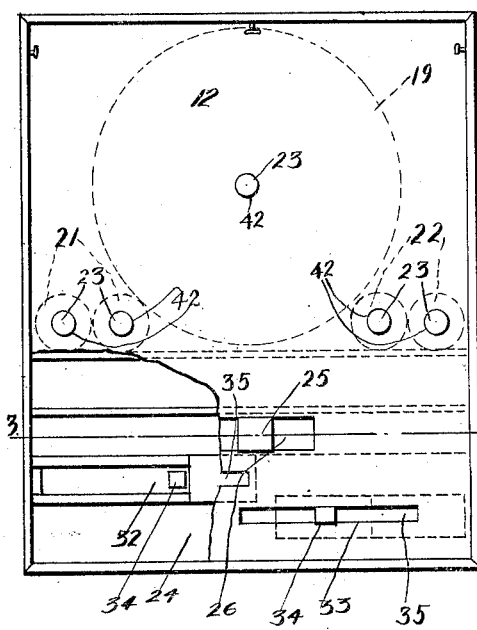
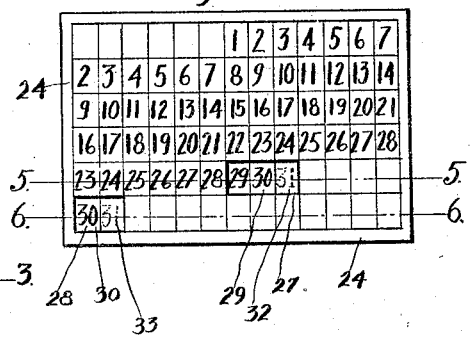
George E. Manahan, INVENTOR.
BY Victor J. Evans, ATTORNEY.
WITNESS:

Feb. 10, 1925.

G. E. MANAHAN

CALENDAR

Filed June 16, 1923   2 Sheets-Sheet 2

1,526,166

Patented Feb. 10, 1925.

1,526,166

UNITED STATES PATENT OFFICE.

GEORGE E. MANAHAN, OF JERSEY CITY, NEW JERSEY.

CALENDAR.

Application filed June 16, 1923. Serial No. 645,879.

*To all whom it may concern:*

Be it known that I, GEORGE E. MANAHAN, a citizen of the United States, residing at Jersey City, in the county of Hudson and State of New Jersey, have invented new and useful Improvements in Calendars, of which the following is a specification.

This invention relates to calendars and more particularly to perpetual calendars.

The principal object of the invention is the provision of a calendar capable of use for an indefinite period of time, wherein the same may be set to prominently display the current year, the month and the days of the month under the corresponding days of the week and if desired the same may be conveniently employed for ascertaining the particular day of the week of a certain past or some future event.

Another object of the invention is the provision of a perpetual calendar which is simple in construction and operation, inexpensive of manufacture and highly ornamental in appearance.

Another object of the invention is to provide a perpetual calendar wherein the correct number of days of any particular month may be exposed.

With these and other objects in view, the invention resides in certain novel construction and combination and arrangements of parts, the essential features of which are hereinafter fully described, are particularly pointed out in the appended claim, and are illustrated in the accompanying drawings, in which:—

Figure 1 is a front elevation of my improved calendar showing parts broken away.

Figure 2 is a rear elevation with parts broken away.

Figure 3 is a horizontal sectional view on the line 3—3 of Figure 2.

Figure 4 is a detail plan view of the slide.

Figure 5 is a transverse sectional view on the line 5—5 of Figure 4.

Figure 6 is a similar view on the line 6—6 of Figure 4.

Figure 7 is an enlarged view of one of the tables.

Figure 8 is a similar view of the other of said tables.

Like characters of reference refer to like parts in all views.

Referring more particularly to the drawing, the reference numeral 10 designates a frame of any size and configuration and in which is mounted a panel 11, a mat 12 arranged behind said panel and spaced therefrom, and a transparent glass 13 for the front of said panel. This arrangement provides an attractive and ornamental structure resembling a picture which may be hung upon the wall.

The panel 11 is cut out centrally at its lower end to form an opening 14, and arranged at the top of said opening 14 are seven spaces 15, having suitable indicia therein to designate the days of the week, beginning with Sunday and ending with Saturday. Above the opening 14 and centrally thereof is another opening 16, and to each side of the opening 16 are pairs of openings 17, 17 and 18, 18. The openings are all adapted to permit the exposing of certain indicia carried by a plurality of disks, a slide and walls attached thereto, a description of which will now be set forth.

Mounted in the space between the panel 11 and the mat 12 and above the opening 16, is a disk 19 having arranged radially thereon, suitable indicia 20, which indicia sets forth the name and number of the months of a year together with the number of days in the particular month. Similarly mounted above the openings 17, 17 and 18, 18 are disks 21, 21, and 22, 22 respectively. The disks 21, 21 and 22, 22 all have a series of numbers arranged radially thereon ranging from zero to nine and which are adapted to register with the respective openings 17, 17 and 18, 18 to denote collectively any desired year. Each disk is provided with a manipulating knob 23 which project through openings 42 in the mat 12 and are operable from the rear of the structure for rotating the disks.

Slidable across the opening 14 and mounted between the panel 11 and mat 12, is a slide 24 which slide has arranged thereon numerals which designate the days in thirteen different columns so that the slide may be set to permit the first day of the month to fall under any of the seven days of the week. The slide 24 is further provided with a manipulating knob 25, which projects through a slot 26 in the mat 12 and is employed for adjusting the slide with relation to the days of the week. In order that the correct number of days in a particular month may be exhibited through the opening 14, I provide the slide 24 with a pair of openings 27 and 28, behind which are mounted spaced walls 29 and 30 respectively. The wall 29 is divided into three spaces and has thereon the numerals 29, 30 and 31 representing days of the month, and the wall 30 is provided with two spaces bearing the numerals 30 and 31 representing days of the month. Slidable between the walls 29 and 30 and the slide 24, are auxiliary slides 32 and 33 respectively, each provided with a manipulating knob 34, extending through slots 35 in the mat 12. The auxiliary slides 32 and 33 act as a blind to cover certain of the days during short months, while the same may be moved to expose all the days during a month of thirty-one days. The slide 33 will only be exposed to the opening 14 when the first day of a month falls on either Friday, or Saturday. It will then be seen that a novel form of slide has been provided wherein the correct number of days of a particular month may be exhibited.

Adjacent the opening 14 on panel 11 are two tables one arranged in the lower left hand corner and the other in lower right hand corner which I shall refer to as table A and table B respectively. The table A is provided at the top with four columns of numbers 34' designating the first two figures of a year the said table beginning with 17 and ending with 80. These figures also represent hundreds of years and may be carried out indefinitely. Arranged directly beneath each of these four columns 34' are columns of numbers 35' ranging from 00 to 99 which designate the last two figures of a year, and adjacent each horizontal row of these numbers is a column of symbols 36 which act as a key to the table B about to be described. The numbers in the columns 35' are arranged in four one-hundred year groups and represent a four-hundred year cycle, as each day of the year falls on the same day of the week every four hundred years. The hundred year groups are arranged in twenty-eight year cycles when each day of the year falls on the same day of the week every twenty-eight years. For the sake of convenience, I designate the leap years by underscoring the numbers as at 37. Of course other means may be employed if desired such as coloring the same or making the same of heavier type.

With reference to table B, I divide the same into twelve vertical spaces 38, at the head of which are listed the months of a year. Listed vertically beneath each month are the days of the week designating when each month begins during any particular year and arranged alphabetically in the left margin of the table are symbols 39 which are responsive to the symbols 36 of the table A.

It will be noted that the table B is divided into two separate groups C and D for distinguishing the first day of a particular month as between common and leap years.

In practice, we shall presume that it is desired to set the calendar for the month of April 1923. The first step is to rotate the disk 19 until the month of April is brought into register with the opening 16, after which the disks 21, 21 and 22, 22 are revolved until the numerals 1, 9, 2, 3, are respectively in registration with the openings 17, 17 and 18, 18. We now refer to the table A to find in which column the first two figures of the year 1923 are located. The numeral 19 is found in the third column from the left, after which we follow downward to the column 35', to the numeral 23 designating the last two figures of the year 1923, and find that the same is on a line with the symbol B. This information at hand we refer to table B, symbol B. On a line with symbol B and under the month of April we find that the first day of April falls on a Sunday. This information at hand we move the slide 24 to a position so that the first day is in vertical alignment with the word Sunday inscribed above the opening 14. In order to find the number of days in April, we refer to the disk 19 above the word April, which sets forth that April has thirty days. We now move the auxiliary slide 32 to expose the numerals 29 and 30 and thereby set the calendar for the month of April 1923. From the foregoing explanation it will be seen that there has been provided a calendar for every day use which also may be employed for determining the day of the week of any particular past or future event.

The panel 11 is provided with a space 40 at the top, upon which may be stamped or placed a picture or suitable advertising indicia, and also arranged below the group C of table B is a blank space for suitable directions for setting the calendar.

In order to distinguish the working days of a month from Sundays, I place a colored tape or other marker 41 between the Sunday and Monday columns.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claim.

What is claimed as new is:—

A calendar comprising means for exposing a particular month of a year, means for exposing a particular year, a table having columns of numbers indicative of the first two figures of a year, columns of numbers beneath said first column of numbers indicative of the last two figures of a year, symbols adjacent the horizontal rows of the last figures, a second table having columns of indicia indicative of the days of the week, above which are the months of a year, and symbols adjacent the horizontal rows of indicia designating the days of the week, the symbols of both of said tables co-acting to determine the day of the week on which the first day of a month appears.

In testimony whereof I have affixed my signature.

GEORGE E. MANAHAN.